United States Patent [19]

Crowley, Jr.

[11] Patent Number: 4,639,836
[45] Date of Patent: Jan. 27, 1987

[54] UNENCAPSULATED CHIP CAPACITOR

[75] Inventor: Harris L. Crowley, Jr., Simpsonville, S.C.

[73] Assignee: Union Carbide Corporation, Danbury, Conn.

[21] Appl. No.: 683,796

[22] Filed: Dec. 19, 1984

[51] Int. Cl.⁴ .............................................. H01G 9/00
[52] U.S. Cl. ...................................... 361/433; 29/570
[58] Field of Search ........................... 361/433; 29/570

[56] References Cited
U.S. PATENT DOCUMENTS 3,566,203  2/1971  Maguire .............................. 361/433
3,581,159  5/1971  Piper .................................. 361/433
4,017,773  4/1977  Cheseldine ......................... 361/433
4,090,288  5/1978  Thompson et al. .................. 29/570
4,488,204  12/1984 Beck, Jr. ............................. 261/433

Primary Examiner—Michael L. Gellner
Assistant Examiner—Douglas S. Lee
Attorney, Agent, or Firm—Eugene Lieberstein

[57] ABSTRACT

An unencapsulated electrolytic capacitor comprising an anode body with a peripheral manganese dioxide layer, having a thin insulative oxide coating on a portion of the manganese dioxide layer to prevent short-circuiting of the capacitor.

3 Claims, 8 Drawing Figures

UNENCAPSULATED CHIP CAPACITOR

This invention relates to solid electrolytic capacitors, e.g., solid tantalum capacitors. More particularly, the present invention is directed to unencapsulated chip capacitors for mounting on circuit boards.

Unencapsulated chip capacitors commonly comprise a tantalum anode body of substantially rectangular cross section having an axial tantalum anode lead wire extending only a short distance from the anode body, to which is welded a transverse metal strip for electrical connection to a land or conductive bar on a circuit board; the metallized portion of the tantalum anode body is adapted to be electrically connected to a similar land or conductive bar to place the chip capacitors in-circuit on the circuit board. In the automatic positioning of tantalum chip capacitors on the lands, in view of the very close dimensions involved, there is the chance that the portion of the tantalum anode body adjacent the transverse anode strip connection will unintentionally be placed in contact with the land to which the transverse anode strip is to be connected, resulting in a short circuit of the capacitor.

It is accordingly an object of the present invention to provide a solid tantalum chip capacitor device which is not susceptible to short circuiting as described above.

Figure 1:
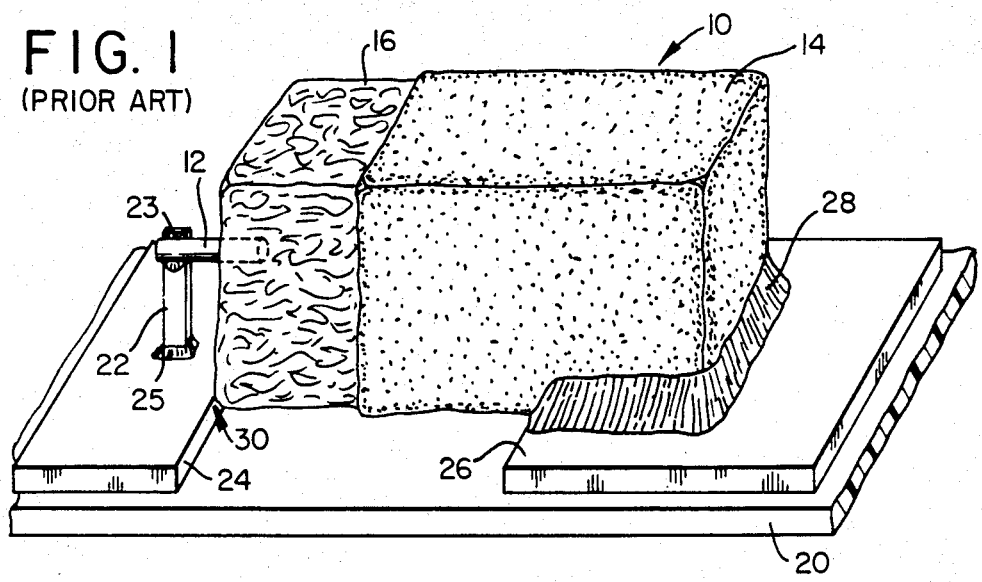
Figure 2:
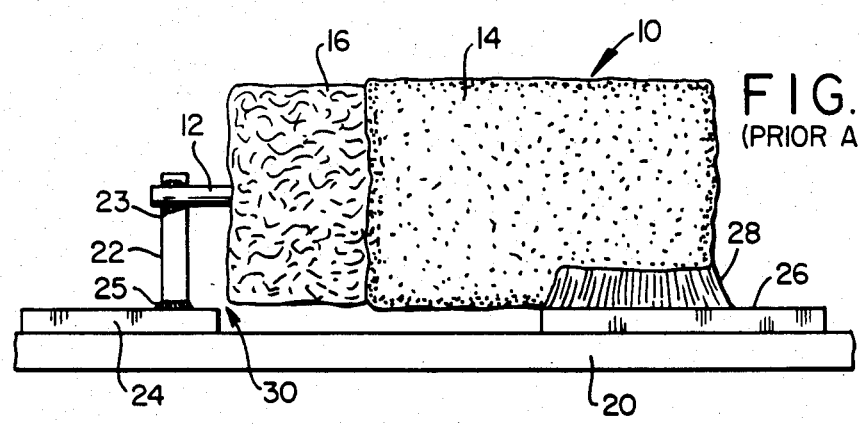
Figure 3:
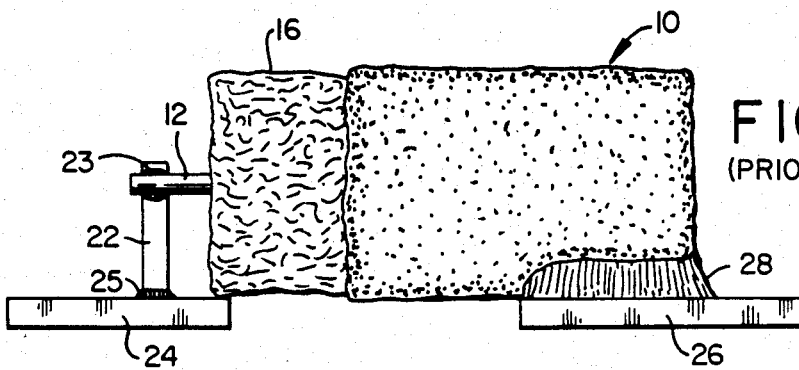
Figure 4:
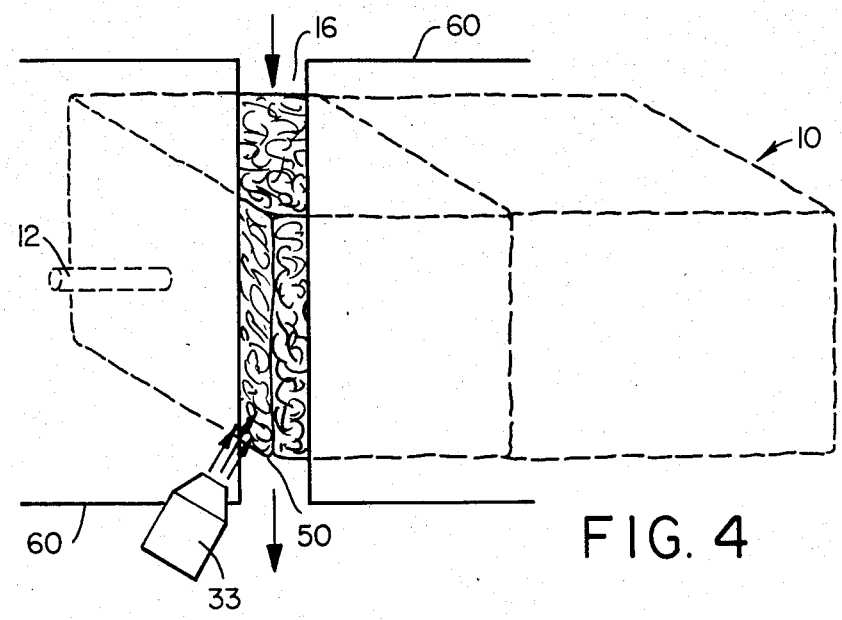
Figure 5A:
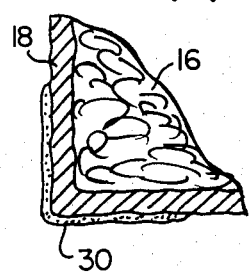
Figure 5:
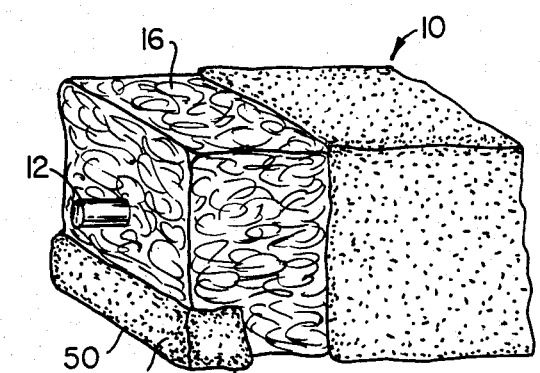
Figure 5B:
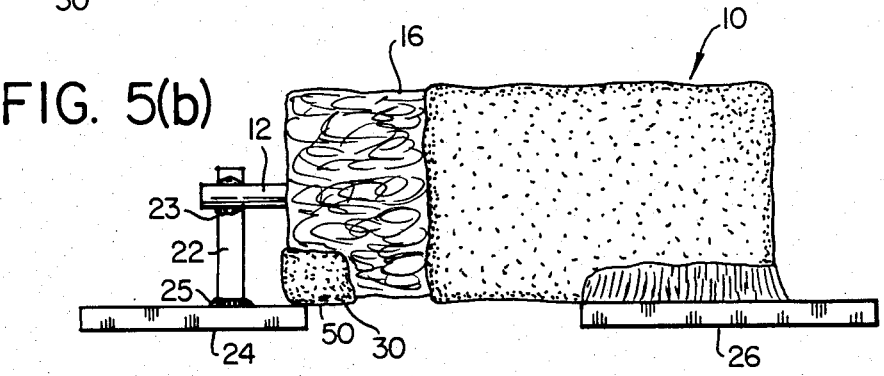
Figure 6:

Other objects will be apparent from the following description and claim taken in conjunction with the drawing wherein FIGS. 1 and 2 show a conventional, unencapsulated solid electrolytic chip capacitor mounted on a circuit board, FIG. 3 shows the capacitor of FIG. 2 improperly mounted on the circuit board, FIG. 4 illustrates schematically a technique for applying an oxidic edge coating on an unencapsulated chip capacitor in accordance with the present invention, and FIGS. 5, 5(a) and 5(b) show an unencapsulated electrolytic chip capacitor in accordance with the present invention, and FIG. 6 is a microphotograph (original magnification: 200×) of an unencapsulated chip electrolytic capacitor in accordance with the present invention.

With reference to the drawing, FIG. 1 shows an unencapsulated chip capacitor 10 which comprises a tantalum anode body which has been conventionally provided with a manganese dioxide electrolyte layer and has a relatively short, e.g., 0.02 to 0.08 inch, anode lead wire 12, and a cathode metallization 14, e.g. solder-coated copper, covering a major portion of the manganese dioxide layer. Unmetallized portion 16 of the porous tantalum capacitor body 10, is covered with an exposed, uneven maganese dioxide layer, resulting from the conventional processing of solid tantalum capacitors, indicated in detail at 18 in FIG. 5(a). With further reference to FIG. 1, a common manner of electrically connecting a tantalum chip capacitor in-circuit on a circuit board 20 is to provide a transverse metal strip 22 welded to anode lead 12 at 23, and land 24 at 25, and welding cathode metallization 14 to 1 and 26 as indicated at 28. In order to maximize the volumetric efficiency of capacitor 10, lead 12 is made very short in length, e.g., about 30 mils and, as a result, the distance 30 between land 24 and the manganese dioxide-coated portion 16 of capacitor 10 is correspondingly small. The capacitor 10, in commercial operations, is automatically placed on lands 24, 26 of circuit board 20 to achieve the position shown in FIG. 2.

However, it is possible, in view of manufacturing tolerances and the small dimensions involved, that in the course of the automatic positioning of capacitor 10 on circuit board 20 the capacitor position shown in FIG. 3 occasionally occurs in which the manganese dioxide portion 16 of capacitor 0 is in contact with land 24, as indicated at 27; in such circumstance, anode lead 12 is short circuited and the capacitor 10 is hence inoperative.

In accordance with the present invention, this situation is over-come by applying a thin layer of oxidic insulating material, e.g. a high melting point, stable, electrically insulative oxide such as alumina, $Al_2O_3$, indicated at 30 in FIG. 6(a), on the edge region portion of the maganese dioxide layer 16 adjacent to land 24. This is accomplished, with reference to FIG. 4, by directing a stream of stable, small, oxidic particles, e.g., $Al_2O_3$, suitably sized 8.5 to 11 microns from a plasma arc torch 33, onto an edge region 50 of manganese dioxide coated portion 16, which edge region will be adjacent land 24, to which anode strip 22 is to be connected as indicated in FIG. 5(a). In the arc torch 33, an electric arc is established between a tungsten electrode and a second electrode and an inert gas, such as argon, is passed in contact with the tungsten electrode to contain the arc. The effluent emerging from the torch comprises a high pressure arc and high thermal content argon effluent. The $Al_2O_3$ particles introduced into the argon stream are partially melted in the arc torch effluent and form plastic bodies which deform and interlock into leaflike shape on impact with edge region 50 of manganese dioxide layer 16 of capacitor 10 and become bonded and interlocked with each other and the relatively uneven maganese dioxide surface of region 50. Mask 60 is used to confine the stream of $Al_2O_3$ particles to the edge region 50 as capacitor 10 is moved past torch 30 in the direction indicated. With reference to the microphotograph of FIG. 6 (original magnification 200×), the resulting $Al_2O_3$ coating 30 in region 50 of FIG. 4 is a coherent insulative lamellar structure which interlocks with and conformally and completely covers and strongly adheres to the relatively rough and porous manganese dioxide coating 18 of edge region 50.

Particular advantages of the oxide coating in accordance with the present invention are as follows: a thin essentially uniform, 0.1 to 2 mil, highly insulative coating is achieved which does not penetrate or otherwise interfere with the capacitor; the coating is stable and strongly adherent at high temperatures up to 350° C., at which temperature the manganese dioxide layer of the capacitor begins to decompose; the coating can be precisely localized by conventional masking techniques, the coating being a homogeneous stable oxide coating, does not decompose or age under high temperature operating conditions.

In the present invention, the oxide coating provided is suitably 0.1 to 0.2 mils thick and the particles introduced into the plasma arc torch are suitably sized very fine, up to 11 microns in diameter, suitably 8 to 11 microns; larger particles could lead to damage of the manganese dioxide coating, due to high meomentum and insufficient melting, i.e., plasticity, and an unsatisfactorily bonded coating would also result.

In applying an aluminum oxide coating in accordance with the present invention, a non-transferred plasma arc torch of the type described in U.S. Pat. No. 3,016,447 can be used without an argon shielding gas. The argon gas flow into the torch can be 300 cubic feet per hour and the arc current TiO2, ZrO2, SiO2 amperes at 60±5 volts. The arc torch standoff can be about 2½ inches and the capacitor bodies can be traversed past the torch at a rate of 6 inches per second, typically 20 capacitors per second. Other high melting point, stable oxides that can be used beside $Al_2O_3$ include $TiO_2$, $ZrO_2$, and $SiO_2$.

What is claimed is:

1. A solid unencapsulated electrolytic capacitor of substantially rectangular cross section comprising a tantalum anode body having a relatively short axial lead wire extending from one end and having a peripheral uneven manganese dioxide layer which is mostly covered by metallization but which is exposed at said end of the capacitor body from which the axial lead wire extends; a metal anode strip transverse to said axial lead wire joined thereto and spaced from said end of the capacitor body and being coextensive with an edge region of said end of said capacitor body; a thin, electrically insulative, adherent oxide coating bonded to and interlocking only with the peripheral manganese dioxide layer at said edge region and being formed of microscopic leaflike interlocking particles of oxide.

2. A capacitor in accordance with claim 1 wherein said oxide is selected from $Al_2O_3$, $TiO_2$, $ZrO_2$ and $SiO_2$.

3. A capacitor in accordance with claim 1 wherein said oxide is $Al_2O_3$.

* * * * *

UNITED STATES PATENT AND TRADEMARK OFFICE
CERTIFICATE OF CORRECTION

PATENT NO. : 4,639,836
DATED : January 27, 1987
INVENTOR(S) : Harris L. Crowley, Jr.

It is certified that error appears in the above—identified patent and that said Letters Patent is hereby corrected as shown below:

Col. 1, line 55, the word "maganese" should be corrected to -- manganese --.

Col. 2, line 8, the figure "0" should be changed to -- 10 --; line 16, the words "Fig 6(a)" should be -- Fig. 5(a) --; in line 17, the number "16" should be -- 18 --; in line 34, the number "16" should be -- 18 --; in line 63, the word "meomentum" should be changed to -- momentum --.

Signed and Sealed this

Eighth Day of September, 1987

Attest:

DONALD J. QUIGG

*Attesting Officer*   *Commissioner of Patents and Trademarks*